United States Patent
Tamatsukuri

[11] 3,803,434
[45] Apr. 9, 1974

[54] RADIAL SUPPORTING MEMBER FOR A BEARING ASSEMBLY OF A VERTICAL TYPE DYNAMO ELECTRIC MACHINE

[75] Inventor: Teiichi Tamatsukuri, Funabashi, Japan

[73] Assignee: Hitachi Ltd., Tokyo, Japan

[22] Filed: Sept. 13, 1972

[21] Appl. No.: 288,796

[30] Foreign Application Priority Data
Sept. 13, 1971 Japan.............................. 46-70438

[52] U.S. Cl...................... 310/157, 310/90, 310/91
[51] Int. Cl. ............................................ H02k 5/00
[58] Field of Search ............ 310/91, 89, 157, 66, 90

[56] References Cited
UNITED STATES PATENTS

| | | |
|---|---|---|
| 2,260,814 | 10/1941 | Wood ................................ 310/157 |
| 2,473,847 | 6/1949 | Baudry.............................. 310/157 |
| 3,549,922 | 12/1970 | Kostin............................... 310/157 |
| 2,722,612 | 11/1955 | Danel................................ 310/157 |
| 2,792,505 | 5/1957 | Baudry.............................. 310/157 |
| 2,767,328 | 10/1956 | Danel................................ 310/157 |

Primary Examiner—R. Skudy
Attorney, Agent, or Firm—Craig and Antonelli

[57] ABSTRACT

An arrangement of a radial supporting member for a combined upper guide and thrust bearing assembly of a vertical type dynamo electric machine which employs a ring plate mechanically coupled to the bearing assembly and radial keys disposed between the ring plate and a concrete supporting base for radially supporting the bearing assembly through the ring plate.

9 Claims, 2 Drawing Figures

PATENTED APR 9 1974 3,803,434

RADIAL SUPPORTING MEMBER FOR A BEARING ASSEMBLY OF A VERTICAL TYPE DYNAMO ELECTRIC MACHINE

BACKGROUND OF THE INVENTION

The present invention relates to a supporting member for a bearing assembly of a vertical type dynamo electric machine, and particularly to a supporting member for a combined upper guide and thrust bearing assembly.

The outward radial force of the vertical type dynamo electric machine is supported by a supporting base thereof through an upper and a lower guide bearing. Conventionally, the combined upper guide and thrust bearing assembly is radially supported by a side wall of a concrete supporting base through a radial supporting assembly having a plurality of upper bearing bracket arms extending radially, a vibration preventing stay fixed to the respective upper bearing bracket arms and an elastic member which is provided for compensating for the thermal expansion of the upper bearing bracket arm and the vibration preventing stay. When a radial force is applied to the radial supporting assembly, almost all the radial force is added only to one upper bearing bracket arm coincident with the direction of the radial force; consequently this force is applied to the corresponding limited area of said wall portion through the vibration preventing stay and the elastic member because of the supporting structure.

Generally, the rotational speed of the vertical type dynamo electric machine has to be determined below the primary dangerous rotational speed which is proportional to the square root of the rigidity of the radial supporting assembly. The radial supporting assembly of a high rotational speed, for example above 500 r.p.m., vertical type dynamo electric machine has to have a large rigidity to increase the primary dangerous rotational speed. However, the mechanical strength of the side wall of the concrete base is limited, consequently the rigidity of the radial supporting assembly is limited. If the rigidity of the radial supporting assembly is required to increase, the thickness of the side wall of the concrete supporting base has to be greatly increased to increase the mechanical strength of the side wall, which causes an economical drawback to the construction of the vertical type dynamo electric machine.

Further the provision of the elastic member of the radial supporting member also causes a decrease in the rigidity thereof.

SUMMARY OF THE INVENTION

One object of the present invention is to provide a radial supporting member for a bearing assembly of a vertical type dynamo electric machine having a large rigidity without increasing the mechanical strength of the side wall of the concrete supporting base for the dynamo electric machine.

Another object of the present invention is to provide a radial supporting member for a bearing assembly of a vertical type dynamo electric machine having a large rigidity while permitting any amount of thermal expansion of the assembly.

A further object of the present invention is to provide a radial supporting member for a bearing assembly of a vertical type dynamo electric machine particularly suitable for a high rotational speed machine.

A still further object of the present invention is to provide a vertical type dynamo electric machine having a higher primary dangerous rotational speed.

The radial supporting member for a bearing assembly of a vertical type dynamo electric machine in accordance with the present invention comprises a ring plate which is mechanically coupled to the bearing assembly and is secured to a horizontal surface of a supporting base for the dynamo electric machine through radial keys which is disposed along the outer periphery of the ring plate with a predetermined similar interval, thereby increasing the rigidity of the radial supporting member while permitting the thermal expansion thereof.

DESCRIPTION OF THE PREFERRED EMBODIMENT

Figure 1:
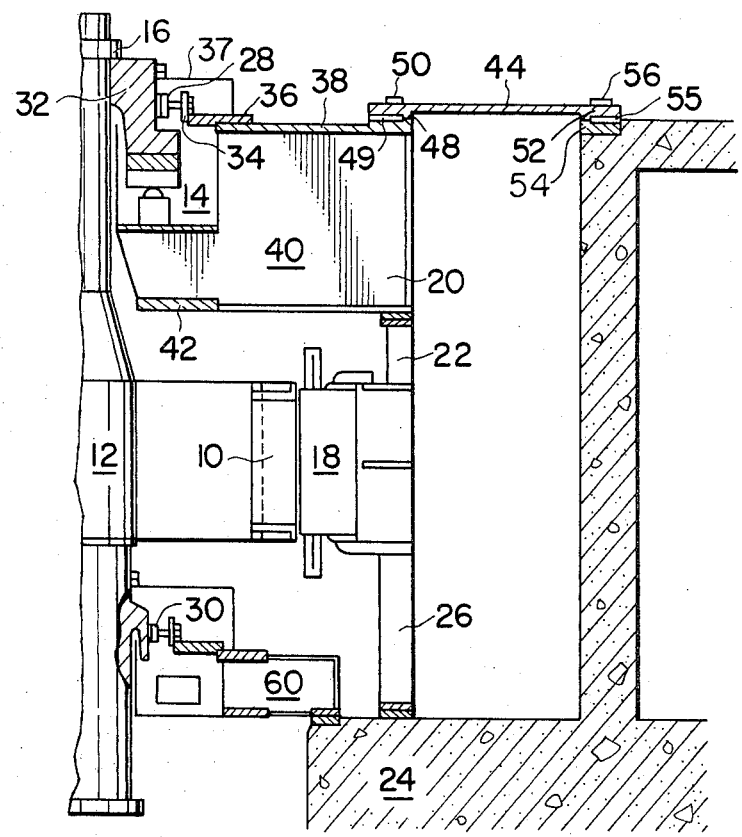
FIG. 1 is a partial cross-sectional view of a vertical type dynamo electric machine embodying the present invention.
Figure 2:
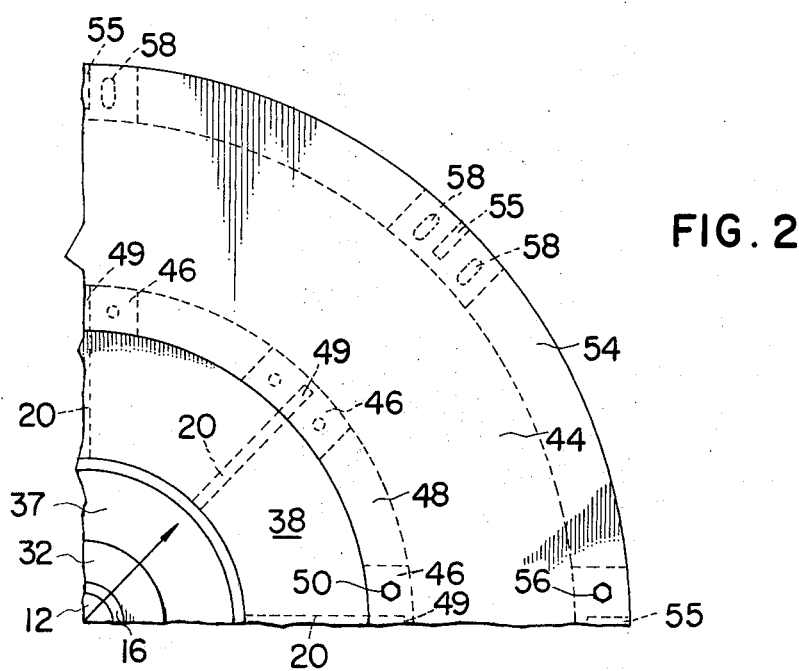
FIG. 2 is a quarter plane view of the structure of FIG. 1.

Referring to FIGS. 1 and 2, a rotor 10 for a dynamo electric machine is secured to a vertical shaft 12. The vertical shaft 12 is vertically supported by a thrust bearing assembly 14 which is disposed at the upper portion of the vertical shaft 12 and is positioned in place through a key ring 16. The thrust bearing assembly 14 is supported by a stator assembly 18 through a plurality of radial extending webs 20 and a first supporting member 22. The stator assembly 18 is supported by a concrete supporting base 24 through a second supporting member 26.

The center of the vertical shaft 12 is kept in a predetermined position during operation of the dynamo electric machine by means of an upper guide bearing 28 and a lower guide bearing 30. The upper guide bearing 28 faces an outer circumferential surface of a thrust collar 32 of the thrust bearing assembly 14. The lower guide bearing 30 faces the circumferential surface of the vertical shaft 12 at the lower portion thereof.

The upper guide bearing 28 is supported by a guide bearing support 34 which is secured to an inner portion of a first ring plate 36. The upper guide bearing 28 and the guide bearing support 34 are covered by an oil reservoir cover 37. The outer portion of the first ring plate 36 is welded to a second ring plate 38 which constitutes an upper bearing bracket 40 together with the plurality of radial webs 20 and a lower ring plate 42. The second ring plate 38 is mechanically connected to a third ring plate 44. A plurality of metal seat pieces 46, at least four, in this embodiment eight, are welded to the second ring plate 38 along the outer periphery thereof with a predetermined, substantially equal interval.

On the third ring plate 44 opposing the outer periphery of the second ring plate 38 there is provided a first metal seat 48 of ring plate 44, which is welded to the second ring plate 38. Between each metal seat piece 46 and the first metal seat 48 of ring plate 44 a radial key 49 is inserted. The inner portion of the third ring plate 44 is also mechanically secured to the outer periphery of the second ring plate 38 by bolts 50 at the positions where the metal seat pieces 46 are welded. The outer periphery of the third ring plate 44 is supported on a horizontal surface portion of the concrete base 24, where a second metal seat of the ring plate 52 is provided.

On the outer peripheral portion of the third ring plate 44 opposing the second metal seat of the ring plate 52, a third metal seat 54 is welded. Between the second and third metal seats 52 and 54, respectively, a plurality of second radial keys 55 in radial alignment with the first radial keys 49 are disposed. The third ring plate 44 is also mechanically secured fo the second metal seat of ring plate 52 by a plurality of bolts 56 passing through respective play holes 58.

The lower guide bearing 30 is supported by a lower guide bearing bracket 60 which is supported by the concrete supporting base 24.

During operation of the dynamo electric machine, the radial force generated by the rotor 10 is opposed by the concrete supporting base 24 through the upper and lower guide bearings 28 and 30. The direction of the radial force from the rotor is as shown by the arrow in FIG. 2. The radial force is opposed by the concrete base 24 through the whole portion of the first, second and third annular ring plates 36, 38 and 44, except for the portion which aligns with the direction of the radial force. Almost all of the first, second and third ring plates 36, 38, and 44 contribute to support the radial force; as a result, the rigidity of the radial supporting member of the bearing assembly is greatly increased without increasing the mechanical strength of the concrete supporting base and the primary dangerous rotational speed of the vertical type dynamo electric machine is increased.

Further the second radial keys are disposed between second and third metal seats 54 and 52, respectively, in the radial direction and the third ring plate 44 is secured to the third metal seat of ring plate 52 by the bolt 56 passing through the play holes 58. Consequently, any amount of thermal expansion of the first, second and third ring plates 36, 38, and 44 is permitted without reducing the rigidity of the radial supporting member.

In the above embodiment, the second annular ring plate 38 and the third annular ring plate 44 are connected by a plurality of the first radial keys 49 and bolts 50. However, the connection between the second and third annular ring plates is also made by welding, and further the second and third annular ring plates can be made integrally from a single plate.

What is claimed is:

1. A radial supporting member for a bearing assembly of a vertical type dynamo electric machine having a supporting base, comprising:
    a ring plate disposed in a substantially horizontal plane, the inner portion of which is mechanically coupled to said bearing assembly and the outer portion of which extends over a horizontal surface of said supporting base of said vertical type dynamo electric machine,
    a plurality of webs extending radially from said dynamo electric machine and vertically supporting said bearing assembly and said ring plate, and
    at least four radial keys disposed between the outer peripheral portion of said ring plate and said supporting base with a predetermined, substantially equal interval along the circumference thereof.

2. A radial supporting member as defined in claim 1 wherein said ring plate is formed by three concentric partially overlapping rings secured to one another and extending between said bearing assembly and said supporting base.

3. A radial supporting member as defined in claim 2 wherein said concentric rings are secured to each other by bolts extending through the overlapping portions thereof.

4. A radial supporting member as defined in claim 3 wherein said concentric rings are additionally secured by welding.

5. A radial supporting member for a bearing assembly of a vertical type dynamo electric machine having a supporting base, comprising:
    a first ring plate, the inner portion of which is mechanically coupled to said bearing assembly,
    a plurality of radially extending webs for vertically supporting said bearing assembly and said first ring plate,
    a second ring plate partially overlapping said first ring plate, the outer portion of said second ring plate extending over a horizontal surface of said supporting base for said vertical type dynamo electric machine,
    at least four first radial keys disposed between said first and second ring plates with a predetermined, substantially equal interval, and
    at least four second radial keys disposed between the outer peripheral portion of said second ring plate and said supporting base with a predetermined, substantially equal interval along the circumference thereof.

6. A radial supporting member as defined in claim 5 wherein said first and second ring plates are arranged concentrically and are secured to each other by bolts extending through the overlapping portions thereof.

7. A radial supporting member as defined in claim 6 wherein said ring plates are additionally secured to each other by welding.

8. A radial supporting member for a bearing assembly of a vertical type dynamo electric machine comprising:
    a first ring plate, the inner portion of which is mechanically coupled to said bearing assembly,
    at least four first metal seats secured to the outer periphery of said first ring plate,
    a plurality of radially extending webs for vertically supporting said bearing assembly and said first ring plate,
    a second ring plate partially overlapping said first ring plate,
    a second metal seat member secured to the overlapping portion of said second ring plate opposing to said first metal seats,
    first radial keys disposed between said first metal seats and said second metal seat member,
    means for mechanically securing said first ring plate to said second ring plate,
    a third metal seat member secured to the outer peripheral portion of said second ring plate,
    a fourth metal seat member mounted on a horizontal surface of a concrete supporting base for said vertical type dynamo electric machine, said fourth metal seat member being opposed to said third metal seat member,
    at least four second radial keys disposed between said third and fourth metal seat members with a predetermined interval along the circumferential outer periphery of said second ring plate, and means for mechanically securing said second ring plate to said fourth metal seat member through said third metal seat member.

9. A radial supporting member as defined by claim 8 wherein said means for mechanically securing said ring plates to one another include bolts passing through the overlapping portions thereof.

* * * * *